Oct. 26, 1965   E. W. VERES ET AL   3,213,966
LUBRICATOR
Filed April 6, 1965   2 Sheets-Sheet 1

INVENTORS:
Edward W. Veres
Walter E. Draxler
Robert E. Poethig
BY
ATT'Y.

Oct. 26, 1965  E. W. VERES ET AL  3,213,966
LUBRICATOR
Filed April 6, 1965  2 Sheets-Sheet 2
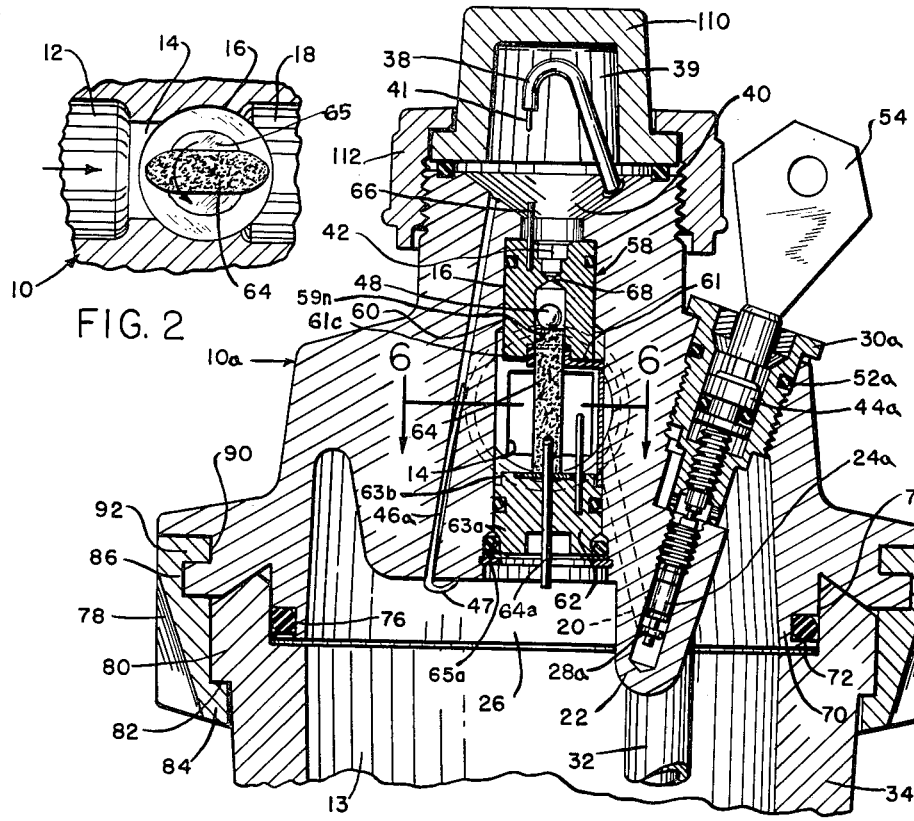
FIG. 2
FIG. 5
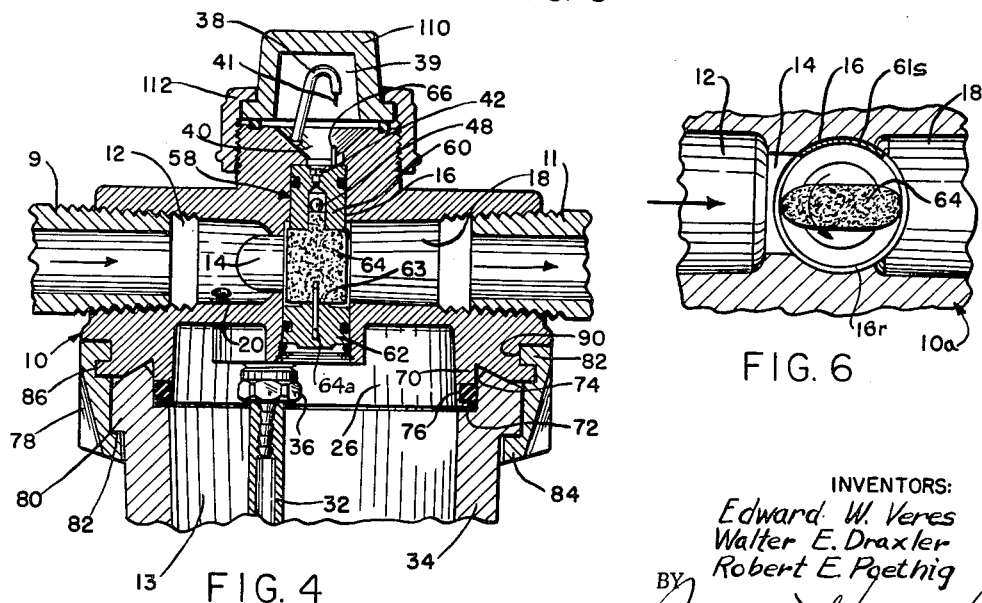
FIG. 4
FIG. 6
INVENTORS:
Edward W. Veres
Walter E. Draxler
Robert E. Poethig
BY
ATT'Y.

United States Patent Office 3,213,966
Patented Oct. 26, 1965

3,213,966
LUBRICATOR
Edward W. Veres and Walter E. Draxler, Arlington Heights, and Robert E. Poethig, Glenview, Ill., assignors to The Bastian-Blessing Company, Chicago, Ill., a corporation of Illinois
Filed Apr. 6, 1965, Ser. No. 445,899
18 Claims. (Cl. 184—55)

The present invention is a continuation-in-part application of Serial No. 272,991, filed April 15, 1963, now abandoned.

The present invention relates to an improved system for lubricating pneumatically operated devices by supplying lubricant to the compressed air that powers the devices.

In the system contemplated by the present invention an air line lubricator having a replenishable reservoir of lubricant dispenses lubricant into the air stream that powers the devices to be lubricated with a metered amount of fine oil particles which can be varied in size down to two to five microns in size as where air is used at high velocity. At low velocities the larger particles are desired.

Accordingly, one of the objects of the invention is to provide an improved oil injection means which is easily adjusted, preferably with visual check, to provide any amount of lubricant desired in an air line and any particle size desired.

A further object of the invention is to provide an air line lubricator which can be adjusted to lubricate light flows of compressed air as well as heavy demands within a range which includes 20% to 100% of the flow capacity of a large venturi with any amount of lubricant in any particle size desired.

The invention is further characterized by an improved arrangement wherein lubricant is supplied to the air line in proportion to the amount of air being used.

Another object of the present invention is to provide a simple arrangement by which the oil supply in a pressurized storage chamber can be replenished quickly and easily with very little loss of air pressure.

A further object of the invention is to provide a pneumatic air line lubricator which is easy to install, service and maintain yet is rugged and simple in its construction and operation for handling by unskilled employees, and which can be readily adjusted without shutting down the air pressure.

These being among the objects of the invention, other and further objects will become apparent to those skilled in the art from the description and the accompanying drawings relating thereto, wherein:

FIG. 2 is a transverse sectional view at the air flow venturi taken upon line 2—2 in FIG. 1;

FIG. 4 is a longitudinal sectional view similar to FIG. 3 taken in the plane of the inlet and outlet connections of the air line;

FIG. 5 is a view similar to FIGS. 2 and 3 showing compositely another embodiment of the invention; and FIG. 6 is a vertical sectional view essentially at the venturi showing another embodiment of the invention.

The lubricator embodies visual oil drop type feeding with mist injection under a pressure differential. The higher pressure is created on the upstream side and is imposed upon a lubricant reservoir, preferably in a metered relationship to force a predetermined amount of lubricant from the reservoir to an area or a chamber where it can be supplied under visible conditions into a porous diffusion mass that is subjected to the lower pressure on a downstream side of the device. The velocity of the air and extent of contact with the diffusion mass is adjustable for particle size and pressure differential either separately or simultaneously. An air by-pass from the high pressure side to the oil supply chamber can be readily controlled from outside the lubricator while in operation to provide a regulated differential pressure between the oil supply chamber and the oil reservoir and thereby control the quantity of oil supplied during working conditions and also assure a constant aspiration of the oil into the diffusion mass for immediate and continuous dissipation into the air stream as a mist.

Figure 7:
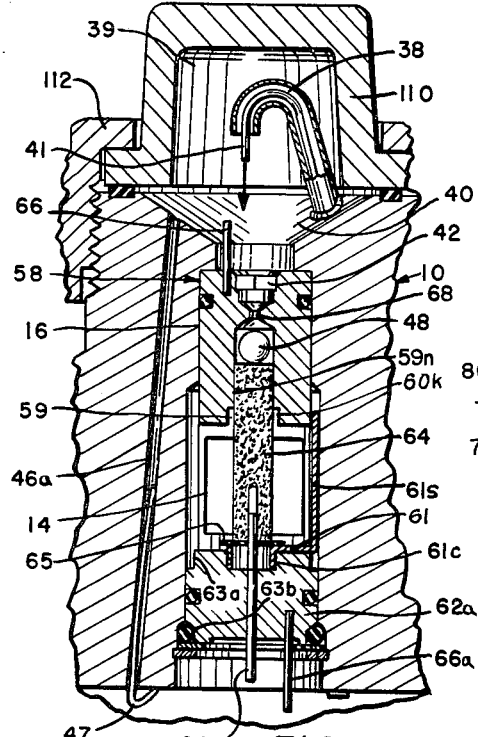
Figure 1:
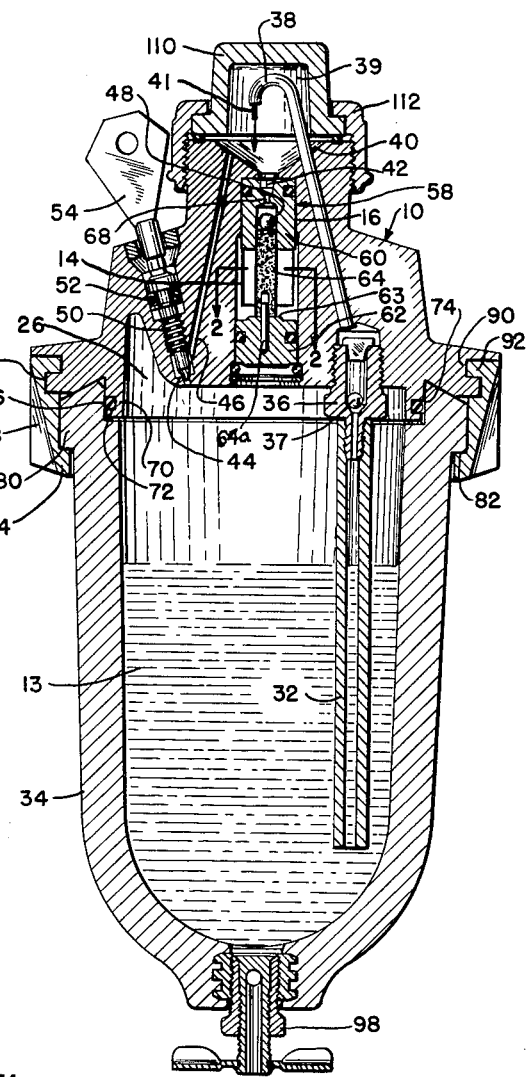
FIG. 1 is a vertical sectional view through a lubricator embodying the preferred form of invention connected in a compressed air line used for pneumatic tools.

In FIGS. 1 and 4 a lubricator body 10 is shown connected in a compressed air line with an input coupling at 9 and an output coupling at 11. A bowl 34 is secured to the body releasably by a lock ring 78 to provide a unitized lubricator with an oil reservoir 13. As viewed in FIG. 4, the main portion of the air supplied to the pneumatic device is conducted into the inlet 12 of the housing 10 and through a venturi having a rectangular throat 14 and then through a vertically disposed cross bore 16, out through the enlarged downstream side 18, and into the downstream conduit 11.

Figure 3:
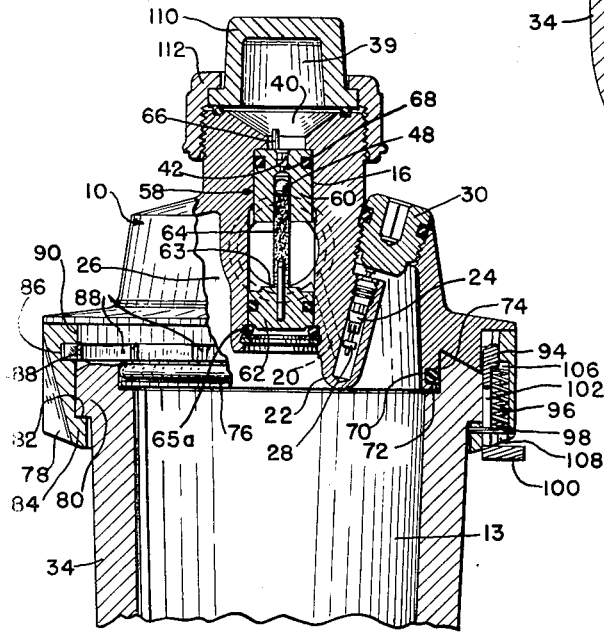
FIG. 3 is a vertical sectional view of the lubricator shown in FIG. 1 taken at another angle and essentially through the head portion thereof.

A passage 20 (FIGS. 3 and 5) leads from the upstream side 12 through a boss 22 and through a valve chamber 24 into the top portion 26 of the lubricant reservoir 13. A check valve 28 closing the direction of flow of air through passage 20 is actuated by a filler plug device 30, or 30a. When the filler plug is in place, as shown threaded into the housing 10 (FIG. 3), the valve 28 is held open against the closing force of air flowing through it. Then whenever the filler plug 30 is removed, the check valve 28 is forced to close by the air moving therethrough. Closure of the valve cuts off the supply of pressure to the lubricant reservoir through passage 20. The filler plug 30 can be loosened to vent the reservoir and close the valve whereupon the plug can be removed if desired to replenish the reservoir with oil.

It will be observed in FIG. 1 that a flexible oil eduction tube 32 extends to a point near the bottom of the reservoir bowl 34 as mounted upon a check valve fitting 36 having a ball check 37 therein opening with the eduction flow of oil upwardly through the tube 32 and closing to prevent any back flow of oil therethrough. The upper end or downstream side of the fitting 36 leads to an oil supply nozzle 38 located in a drop or oil supply chamber 39 disposed above a conical cavity 40 in the top of the housing 10. A wire 41 preferably is provided in the outlet end of the nozzle 38 for a dual purpose. Its diameter reduces the flow area therethrough for orifice purposes to minimize pulsing or "breathing" effects on the oil therein and its end extends downwardly beyond the end of the nozzle 38 to draw oil away from the nozzle as fast as it flows through the nozzle so that it is swept away substantially as a continuous process by air moving in the chamber 39 as distinguished from an intermittent supply involving the formation and discharge of drops.

The cavity 40 is in communication with the upper end of the cross bore through an opening 42 and under working conditions oil flows from the lubricant storage compartment 13 through the eduction conduit 32 past the valve 37 because the pressure is higher, and proportionately so, in the oil reservoir 13 than it is in the chamber 39. This pressure differential not only varies suddenly upon occasions because the compressed air in most installations is used intermittently, but the pressure differential can and does upon occasion momentarily reverse itself. Under these circumstances the check valve 37 retains the prime of the nozzle against reverse pressure differentials.

The degree of the working differential pressure between the chamber 39 and the oil reservoir 13 in FIG. 1 is controlled by an adjustable valve 44 located in a passage 46 leading from the top of the oil reservoir 13 to the chamber 39. The valve 44 is threaded into the body 10 as at 50 and sealed against leakage as by an O-ring at 52 for rotation by a removable key 54. Adjustment of this valve determines the rate of oil discharge from the nozzle 38 and in this connection it is to be noted that a back flow check valve 48 is provided immediately below the outlet 42 to prevent back flow turbulence in the chamber 39 during working conditions and to permit opening of the reservoir for replenishment without any air line discharge back through the chamber 39.

Reference is now made to FIG. 5, where in lieu of the valve 44 adjustably controls pressure differential in relation to the outflow of air from the reservoir, the filler plug 30 is modified to be a valve controlling the pressure differential in relation to the inflow of air to the reservoir. A filling plug 30a is threaded to receive a valve adjusting element 44a with seal 52a and key 54 which controls the positioning of the check valve 28a. With this construction the valve 44 (FIG. 1) can be eliminated and only a passage 46a having a predetermined orifice pin 47 therein need be provided through the body 10a to bypass the oil supply tube 32 to provide a pressure differential for supplying aspirating air to the chamber 39. With this arrangement the bypass 46a bleeds down the pressure in the oil reservoir 13 as balanced against the inflow of air under pressure past the valve 28a that is adjusted by the threaded member 44a. The working area of the passage 46a is determined by the diameter of the pin 47 which is bent before insertion to frictionally hold itself in position.

Thus with the relative pressure in the chamber 39 determined by the adjustment of the element 44 or 44a in connection with the flow of air under pressure through the passage 46, or 46a, it will be observed that any oil released from the nozzle 38 to the opening 42 will be carried downwardly past the valve 48 by air supplied through the passage 46 or 46a.

In order to diffuse and fog the oil entering the cross bore 16, a rotatable device 58 sealed at the top and the bottom as shown in the various views, is employed comprising upper and lower plugs 60 and 62, respectively, journalled in the cross bore 16 and interconnected by a porous sintered metal blade 64 having a pore size of approximately 123 microns. The sintered metal employed is bronze and the facing ends of the plugs are shaped to support the blade for adjustable rotation thereof at the top, and in journalled relation at the bottom on pin 64a. The rotatable device 58 also includes a sheet metal stamping 61 having a rotatable curbed shield portion 61s disposed concentric with and in close proximity with the wall of the bore 16. The blade 64 and stamping 61 can be rotated rigidly or adjustably together (FIG. 1) or separately (FIG. 6), in cooperation with each other to vary the capacity of the venturi throat and the proportion of air passing through the blade 64.

By way of understanding the relationship being described, a large capacity lubricator can be used with optimum results regardless of the air demand load carried thereby during a particular work period. With full capacity the shield and blade can be adjusted for a pressure drop which will provide the amount of oil desired in conjunction with valve 28 or 28a. This adjustment can be generally accomplished merely by rotation of the blade with a wide open venturi. At a medium capacity, the shield is rotated counterclockwise (FIG. 1) to narrow the venturi 14 since the pressure drop across the blade alone at half air volume may not induce the right amount of oil desired, since the velocity may not be a high enough factor to assure the desired required pressure drop for the oil of the desired amount. With a small air flow that would otherwise be below the ability of a large lubricator to lubricate properly, the desired velocity can be provided by closing down the venturi still further in relation to the amount of air being used and adjusting the blade for the pressure drop that provides the oil desired.

However, it has been discovered rather unexpectedly that the two elements disclosed can be rotated as a unit with one adjustment for most oil requirements when velocity is maintained adequate to carry the oil from the porous member as a fog. The less air used the less oil needed therefore, the less the pressure drop but the greater is the proportion of air flow through the porous blade to pick up the oil. Thus, as the shield is turned to reduce the venturi throat the more flow area that is allocated to the porous member the less it becomes a factor in pressure drop once the whole flow is confined to pass therethrough.

For adjustment of the porous blade 64 alone or the blade and shield 61s as a unit, the upper plug 60 is cross kerfed at 59 in two widths to receive the top edge of the blade 64 and the lower portion of the blade is held in position by a pin 63 received in the lower edge of the blade and embedded in the lower plug. The upper face of the upper plug is provided with a hexagonal bore 42 to pass the air and oil from chamber 39 and also receive an Allen wrench for rotating the blade to determine the relative closure of the downstream passage 18 by the blade 64. Annular radial recesses 63a, 63b are provided at the edges of the lower plug 62a to engage a lower O-ring 65a which serves as spring maintaining assembly and to support the lower end of the shield 61s, as will be described later, depending upon the selected inversion of the lower plug 62a. A pin 66, visible in the chamber 39, indicates the position of the blade in relation to the markings L (lean), N (normal) and R (rich) on the conical cavity 40 and a pin 66a carried by the lower plug 62a is also visible from below for the same purpose when the plug 62a is rotatable independently of the upper plug 60.

If the porous blade 64 is turned to close the air passageway, practically all of the air passes through the sintered mass with very little going around the edges, whereas, if the blade is turned almost longitudinally or edgewise to the inlet 12, a major portion of the air will pass around the blade without going through it. The blade begins to span the venturi throat 14 at approximately 45° of its rotation. Whatever air passes through the blade, however, picks up the oil that is present therein as replenished by oil from the nozzle 38 passing through the hexagonal bore 42 in the bottom of the cavity 40. The oil passes through an interconnecting orifice 68, past the valve 48 that leads through the upper plug 60 and is placed in soaking engagement with the upper edge of the blade as aspirated by the air supplied through the passageway 46.

As seen in FIG. 6 the shield 61s is disposed at a right angle to the flat of the blade 64 where it is located in the recess portion 16r of the bore 16 out of the path of air flow where the bore extends radially beyond the wall of the venturi throat 14. If it is desired to permit some air to pass around the blade in all adjusted positions in a particular lubricator, the upstream edge can be located closer to the upstream edge of the shield, the 90° angle illustrated being reduced by as much as 35°. If it is desired to have all air pass through the blade it can be located with the upstream edge farther away from the shield.

If the relationship between the blade and shield is to be preset in original equipment the top of the shield 61s is provided with an outrigger arm 61 offset upwardly as at 61c to form a saddle portion that straddles the top edge of the blade as disposed between same and the cross kerf 60k in the upper plug member 60. The angularity desired between the blade and shield is built into the relative angle of the saddle.

The shield is impervious and preferably is wide enough to close at least 80% of the venturi throat area upon rotation in counterclockwise direction without completely shutting off the flow of air at anytime. This provides an effective flow area venturi adjustment having a range which includes 100% to 20% open, less the silhouette or effect of the blade itself. The width of the shield can be desired for any minimal opening of the venturi.

Moreover, as the shield is moved and begins to restrict the flow area, the blade comes effectively more and more within the low pressure region of the differentiated pressure thus further urging movement of oil into the porous blade.

In FIG. 6 the arrangement contemplated for indepenednt adjustment is shown in which the blade is rotated by rotation of the upper plug 60 as described, and the lower plug 62 is replaced by a plug 62a which has a contour that interlocks with the offset 61c on the outrigger arm with the shield installed in its inverted position. The plug 62a, having the pin 64a therein, is rotated by engaging a screw driver blade (not shown) between pins 66a and 64a at a time when the bowl 34 is removed. The pin 66a also indicates the relative shield position and serves as a lower axle member 64a which journals the lower end of the blade to permit independent rotation of the shield 61s with respect thereto with a spacer 65 provided to serve as a bearing for the lower end of the blade 64 and also to raise the blade for engagement in the upper narrow portion 59n of the kerf 59.

It is to be noted that the opposite end of the shield is rotatably braced against the land 63 and since both the blade and shield are radially balanced they will not creep from an adjusted position under air movement.

In operation it will be observed that once the blade is set in a predetermined position, it will cooperate with the venturi throat at 14 or any reduction of this area associated with the positioning of the shield 61s to provide a pressure differential on opposite sides thereof with the higher pressure effective upon the oil reservoir through the valve 28 for the purpose of forcing oil upwardly through the conduit 32. The oil is discharged from spout 38 and is aspirated into the sintered metal blade by air bypassing the valve 28 through the conduit 46. Adjustment of the valve opening 28a or the valve 44 also varies the pressure differential effective between the bottom of the tube 32 and the spout 38 with respect to the amount of oil delivered. Accordingly, the amount of oil passing from the spout 38 can be controlled by several simple adjustments as related to the amount of air passing through the venturi.

Air passing through the blade violently flushes the oil from the blade in a fog or mist of particles of a very small size to assure their suspension in the air stream leading to the pneumatic devices. The amount of fog is determined, of course, by the amount of oil passing from the nozzle 38. When, however, heavier particles of oil are desired in the air line, the blade can be turned to a position closer to alignment with the air passageway. Then, with less air passing through the sintered blade, the air that does pass through flushes out the oil in larger particles.

Whenever it becomes desirable to replenish the oil reservoir 13, the plug 30 can be loosened to vent the reservoir with back flow check valves 28, 37 and 48 closing to prevent air pressure from escaping. Then the plug 30 can be removed, and if the plug 30 is removed, the replenishing oil can be poured through the plug opening.

On the other hand, in both embodiments disclosed it is preferred to remove the bowl by actuation of a quickly manipulated retainer ring and just fill the open bowl 34 from a handy supply device and return it immediately to place with the ring snapped again into place without fully removing the plug 30.

This ring and attachment of the bowl is further described and claimed in our application Serial No. 410,136. It is sufficient here to merely point out that for purposes of releasably supporting the oil reservoir bowl on the body 10 a downwardly extending annular flange 70 having an external O-ring groove 72 therein is provided upon the bottom of the body 10. For mating therewith the upper end of the bowl 34 is offset outwardly to provide a cylindrical surface 74 which telescopes over flange 70 wtih sufficient clearance that it can be readily attached and removed. An O-ring in the groove 72 seals the joint against escape of air under pressure.

The bowl is supported loosely in said telescoping relationship by a quickly attached and detached ring 78. In providing this support, the bowl has a peripheral flange 80 that is provided a shoulder 82, and the ring 78 is provided with an inwardly extending flange 84 which engages and supports the flange 80 when in position to do so.

The ring 78 is locked against removal and for this purpose is provided with an internal groove at 86 which mates with annular male flange segments 88 upon the body 10. Also the body 10 is provided with a groove 90 which mates with annular female segments 92 located adjacent to the upper edge of the ring 78. The flange segments 86 and 92 serve in the nature of bayonet joint elements since the segments in one member slip between the segments in the other member so that they come to meet in the cooperating grooves as described whereupon a slight turning of the ring brings the segments in axial abutting relationship to support the bowl 34 against downward movement.

To lock the segments in abutting relationship, a latch 94 (FIG. 3) is provided upon the ring 78 in a space between two of the segments 92 (FIG. 4). The upper end of the latch intersects the groove 86 in the ring 78 and is spring urged in an upward direction by a compression spring 96 held in place by a cross pin 98. The lower end of the latch has a radial lip 100 thereon serving as a combination stop and manual means for operating the latch. While pressure is present in the bowl, the engaged flange segments are heavily loaded frictionally to prevent inadvertent rotation and disengagement. Moreover, it will be observed that the latch can be received between any two adjacent segments 88 which permits orientation for accessibility of the latch a full 360° around the lubricator.

When it is desired to remove the bowl 34, the filler plug 30 is manipulated to vent the reservoir space 13, the latch 94 is pulled downwardly by its radial lip 100 to clear the body segments 88 and a slight twist thereof interdigitates the segments so that the ring 78 can be lowered and the bowl 34 with it. In this connection it is to be noted that the tube 32 is flexible so that it will not be broken by any lateral movement of the bowl 34 during engagement or disengagement thereof and the ring and latch can be managed with one hand.

As will be observed in FIGS. 1 and 2 a drain valve 98 is provided in the bottom of the bowl 34 for use if desired. Opening this valve slightly while pressure is present in the reservoir 13 will rapidly exhaust the oil or sediment from the bowl 34.

Although a rugged aluminum bowl can be used where solvent vapors or other fluids might damage plastics or where operating pressures up to 250 pounds per square inch might be employed, it is preferred to use plastic bowls which are reinforced with wire mesh where working pressures will not exceed 150 pounds per square inch. It is desirable to use the wire reinforced plastic bowls since they are transparent. A 360° sight cap or dome 110 sealing the chamber 39 and nozzle 38 is secured in sealed relationship by a flange nut 112 and is also preferably made of transparent plastic so that visual observation will reveal by oil drop frequency how much oil is entering the air line. The greater the air flow the greater will be the pressure differential and the flow of oil.

Moreover, it will be appreciated that if remote oil filling devices are employed to replenish the oil in the bowl 34, they can either be attached at the filler plug opening or the drain opening. If attached at the filler plug opening, it will be desirable to have the embodiment constructed where a separate valve 44 is employed as in FIG. 2 to regulate the air bypass to the oil drop chamber 39.

Thus having described the preferred embodiments of the invention, it will be readily apparent to those skilled in the art that various and further changes can be made therein within the objects set forth without departing from the spirit of the invention, the scope of which is commensurate with the appended claims.

What is claimed is:

1. An air line lubricator comprising a body having a passage for conducting pressurized air therethrough, an oil supply chamber in proximity to said passage, a lubricant reservoir,
  means in said passage for producing a pressure differential in said passage between its inlet and outlet when air is flowing through said passage including
  a porous member disposed in a path of air flow and receiving oil from said chamber and
  means for moving said porous member to vary the silhouette area thereof presented to the flowing stream of air under pressure through said passage,
  conduit means including a valve for supplying air to said reservoir at said inlet pressure,
  conduit means for supplying oil from said chamber to said chamber under the influence of the higher pressure,
  oil flow restricting conduit means interconnecting said chamber with said porous member for supplying the porous member with air and oil from the chamber, and
  air flow restricting means conducting air from said reservoir to said chamber to control the pressure differential across the oil supplying conduit means and to dispense oil in said chamber into the air stream in said passage.

2. An air line lubricator comprising a body having a passage for conducting pressurized air therethrough, an oil supply chamber in proximity to said passage, said body having a cross bore in said passage,
  two spaced plugs journalled in said cross bore defining a space between them in the path of air flowing through said passage, one of said plugs having a cross-kerf therein,
  means in said passage for producing a pressure differential in said passage between its inlet and outlet when air is flowing through said passage including
  a porous blade-like member disposed between said plugs and resting in said kerf, one of said plugs having a conduit therethrough interconnecting said chamber and said porous member, and
  means for rotating said kerfed plug member for adjusting the position of said blade-like member in the path of flow of air through said passage,
  a lubricant reservoir,
  conduit means including a valve for supplying air to said reservoir at said inlet pressure,
  conduit means for supplying oil from said reservoir to said chamber under the influence of the higher pressure in the passage,
  oil flow restricting means in said conduit interconnecting said chamber and said porous member, and
  means conducting air from said reservoir to said chamber to provide a controlled pressure drop in the oil supplying conduit means and to disperse oil in said chamber into said porous member.

3. A lubricator comprising a body having a pressurized air conducting passage therethrough and an oil drop chamber in communication therewith,
  an oil reservoir in communication with said chamber to supply oil thereto,
  said passage having means for producing within said body a pressure drop when the air is passing through said passage including
  a porous metal blade disposed in the path of flow of air under pressure therethrough and receiving oil from said chamber,
  conduit means interconnecting the higher pressure in said air line passage and the interior of said reservoir to impose pressure upon the oil therein,
  means for throttling the flow of air through said conduit means, and
  means for bypassing a predetermined amount of air from said reservoir to said chamber to regulate flow of oil from the reservoir to the chamber and aspirate oil from the chamber into said blade.

4. A lubricator comprising a body having a pressurized air conducting passage therethrough and an oil drop chamber in communication therewith,
  an oil reservoir, conduit means in communication with said chamber to supply oil thereto from said oil reservoir,
  said passage having means for producing within said body a pressure drop when the air is passing through said passage including
  a porous metal blade disposed in the path of flow of air under pressure therethrough and receiving oil from said chamber,
  conduit means interconnecting the higher pressure in said air line passage and the interior of said reservoir to impose pressure upon the oil therein,
  means for throttling the flow of air through said conduit means including a valve,
  a filler plug means for controlling the openness of said valve to regulate the flow of oil through said oil supplying conduit means, and
  means for bypassing a predetermined amount of air from said reservoir to said chamber to regulate flow of oil from the reservoir to the chamber and aspirate oil from the chamber into said blade.

5. A lubricator comprising a body having a pressurized air conducting passage therethrough and an oil drop chamber in communication therewith,
  a removable oil reservoir in communication with said chamber to supply oil thereto,
  said passage having means for producing within said passage a pressure drop when the air is passing through said passage including
  a porous metal blade disposed in the path of flow of air under pressure therethrough and receiving oil from said chamber,
  conduit means interconnecting the higher pressure in said air line passage and the interior of said reservoir to impose pressure upon the oil therein,
  means for throttling the flow of air through said conduit means,
  means for bypassing a predetermined amount of air from said reservoir to said chamber to regulate flow of oil from the reservoir to the chamber and aspirate oil from the chamber into said blade, and
  means for adjusting the position of said blade-like member in the path of flow of air through said passage to vary said pressure drop.

6. A lubricator comprising a body having an air line passage therethrough, an oil reservoir and an oil drop chamber in communication therewith,
  said passage having means for producing a pressure drop in the air passing through said passage including a powdered metal sintered blade rotatable on an axis lying in the plane of the blade in the path of flow of air pressure and receiving oil from said chamber, a connecting passage leading from the region of higher pressure in said air line passage to the interior of said reservoir to impose pressure upon the oil therein, means for throttling the flow of air through said passage, and means for bypassing a predetermined amount of air from said chamber to said reservoir to regulate the flow of oil from the reservoir to the chamber and aspirate oil in the chamber in said blade.

7. An air line lubricator comprising a body having a passage for conducting pressurized air therethrough, a lubricant reservoir, means in said passage for producing a pressure differential between the inlet pressure and the outlet pressure in said passage when air is flowing through said passage, conduit means interconnecting the inlet of said passage and said reservoir including a valve for controlling the supply of air to said reservoir, an oil supply chamber in proximity to said passage in communication with said pressure differential producing means, conduit means for supplying oil from said reservoir to said chamber under the influence of inlet pressure, and air flow restricting means conducting air from said reservoir to said chamber to control in cooperation with said valve the pressure differential across the oil supplying conduit means and carry oil in said chamber into the air stream in the outlet portion of said passage.

8. An air line lubricator comprising a body having a passage for conducting pressurized air therethrough, a lubricant reservoir, means in said passage for producing a pressure differential in said passage between its inlet and outlet when air is flowing through said passage, conduit means including a valve for supplying air to said reservoir at said inlet pressure, an oil supply chamber in proximity to said passage, conduit means for supply oil from said reservoir to said chamber under the influence of said inlet pressure, air flow restricting means conducting air from said reservoir to said chamber to control the pressure differential across the oil supplying conduit means, and conduit means interconnecting said chamber with said passage upon the outlet pressure side thereof for dispensing air and oil from said chamber into the air stream in said passage including a flow restricting orifice through which the oil is aspirated by said air from said reservoir.

9. An air line lubricator comprising a body having a passage for conducting pressurized air therethrough, a lubricant reservoir, means in said passage for producing a pressure differential in said passage between its inlet and outlet when air is flowing through said passage, conduit means for supplying air to the top of said reservoir at said high inlet pressure, an oil supply chamber in proximity to said passage, means for supplying oil from said reservoir to said oil supply chamber under the influence of the higher pressure of said pressure differential, conduit means conducting air under said higher pressure to said oil supply chamber, valve means in one of said conduit means to control the pressure drop between said oil supply chamber and said reservoir, conduit means interconnecting said oil supply chamber with said passage upon the outlet pressure side thereof for dispensing air and oil from said oil supply chamber into the air stream in said passage including a flow restricting orifice through which the oil is aspirated by said air conducted to said chamber, and means for controlling the openness of said valve in cooperation with said air flow restricting orifice to regulate the flow of oil through said oil supply means.

10. An air line lubricator comprising a body having a passage for conducting pressurized air therethrough, a lubricant reservoir removably mounted in sealed relationship on said body, means in said passage for producing a pressure differential in said passage between its inlet and outlet when air is flowing through said passage, conduit means including a valve interconnecting the inlet and reservoir for supplying air to said reservoir at said inlet pressure, an oil supply chamber in proximity to said passage, conduit means for supplying oil from said reservoir to said chamber under the influence of the higher pressure present in said reservoir, air flow restricting means conducting air from said reservoir to said chamber, conduit means interconnecting said chamber with said passage upon the outlet pressure side thereof for dispensing air and oil from said chamber into the air stream in said passage including a flow restricting orifice through which the oil is aspirated by said air from said chamber, means for adjusting said valve to control the pressure differential across the oil supplying conduit means to regulate the amount of oil delivered to said chamber, said valve adjusting means releasing the valve to its closed position when venting said reservoir to atmosphere.

11. An air line lubricator comprising a body having a passage for conducting pressurized air therethrough, a lubricant reservoir, means in said passage for producing a pressure differential in said passage between its inlet and outlet when air is flowing through said passage, conduit means including a valve or supplying inlet air to said reservoir under the higher one of the differential pressures, an oil supply chamber is proximity to said passage, conduit means for supplying oil from said reservoir to said chamber under the influence of the higher pressure, air flow restricting means conducting air from said reservoir through said chamber to said passage including conduit means interconnecting said chamber with said passage upon the outlet pressure side thereof for dispensing air and oil from said chamber into the air stream in said passage and a flow restricting means through which the oil is aspirated by said air from said chamber, and means for venting said reservoir to atmosphere including filler plug means for controlling the openness of said valve in cooperation with said air flow restricting means to control the pressure differential across the oil supplying conduit means and regulate the flow of oil through said oil supplying conduit means, and check valves in said oil supplying conduit means and air flow restricting means closing in the direction of backflow of air under pressure to said reservoir.

12. An air line lubricator comprising a body having a passage therethrough defining an inlet portion and an outlet portion, means in said passage for producing a pressure differential between the inlet and outlet portions when air is flowing through said passage, a lubricant reservoir, an oil supply chamber, first conduit means interconnecting said inlet portion and said reservoir for producing pressure in the reservoir above the pressure present in the outlet portion, lubricant diffusion means in said passage subjected to the lower pressure in the outlet portion, second conduit means interconnecting said chamber and diffusion means to subject said chamber to the lower pressure present in said outlet portion, third conduit means for educting oil from said reservoir to said chamber under the pressure in said reservoir, and the first mentioned means including a shield adjustably movable across the passage ahead of said diffusion means to vary the flow area of the passage and control the pressure difference in relation to flow of air therethrough.

13. An air line lubricator comprising a body having a passage therethrough defining an inlet portion and an outlet portion, means in said passage for producing a pressure differential between the inlet and outlet portions when air is flowing through said passage including a lubricant diffusion element and a shield adjustably movable across the passage ahead of the diffusion means to vary the flow area of the passage, a lubricant reservoir, an oil supply chamber, first conduit means interconnecting said inlet portion and said reservoir for establishing a pressure in the reservoir above the pressure in the outlet portion, second conduit means interconnecting said chamber and diffusion means to subject said chamber to the lower pressure present in said outlet portion, and third conduit means for educting oil from said reservoir to said chamber under the pressure in said reservoir.

14. An air line lubricator comprising a body having a passage therethrough defining an inlet portion and an outlet portion, means in said passage for producing a pressure differential between the inlet and outlet portions when air is flowing through said passage, a lubricant reservoir, an oil supply chamber, first conduit means interconnecting said inlet portion and said reservoir including a manually opened valve closing in the direction of the flow of air therethrough for establishing a pressure in the reservoir above the pressure in the oulet portion, lubricant eduction conduit means interconnecting said reservoir and chamber for educting oil from said reservoir to said chamber under the pressure in said reservoir and including a back flow check valve, lubricant diffusion means in said passage subject to the lower pressure in the outlet portion, second conduit means interconnecting said reservoir and said diffusion means through said chamber for conducting air through said chamber to entrain lubricant present in said chamber and convey it to said diffusion means and including a back flow check valve therein, and flow restricted conduit portion interconnecting said reservoir and said chamber.

15. An air line lubricator comprising a body having a passage therethrough defining an inlet portion and an outlet portion and a cross bore intermediate said portions, means in said passage and cross bore for producing a pressure differential between the inlet and outlet portions when air is flowing through said passage, a lubricant reservoir, an oil supply chamber, bypass conduit means interconnecting said inlet portion to said outlet portion through said reservoir chamber and cross bore for movement of air under said pressure differential, flow restriction means in said conduit means ahead of said chamber for establishing a pressure in the reservoir above the pressure in the outlet portion, an air flow check valve in said conduit means ahead of said reservoir to prevent escape of air from said inlet portion when the reservoir is opened to atmosphere, a back flow check valve in said conduit means beyond said reservoir to prevent escape of air from said outlet portion when the reservoir is vented to atmosphere, lubricant supply conduit means for educting oil from said reservoir and supplying it to said chamber under the pressure in said reservoir including a back flow check valve to prevent reverse flow of lubricant therein when the reservoir is vented to atmosphere, lubricant diffusion means in said passage and cross bore pressure in the outlet portion, and shield means for varying the flow area of said passage ahead of said diffusion means to control said pressure differential in relation to the amount of air flowing through said passage.

16. In an air line lubricator having a passage therethrough and a lubricant chamber adjacent thereto, means in said passage for producing a pressure differential between the inlet and outlet of said passage when air is flowing therethrough comprising a lubricant diffusion element, a shield element in said passage ahead of the diffusion element, conduit means for supplying said diffusion element with lubricant from said chamber, said diffusing element having a portion of said flowing air passing therethrough to flush lubricant therefrom in fine particles, means in said conduit means supporting the top of said diffusion element for varying its exposure to said flowing air and the size of said lubricant particles, means supporting said shield element for movement across the passage to vary the flow area of said passage ahead of said diffusion element in relation to the quantity of air flowing through the passage and control said pressure differential, and lubricant reservoir means subjected to said pressure differential for supplying lubricant to said chamber.

17. The combination called for in claim 16 in which said shield means and lubricant diffusion elements are interlocked for joint rotation in their said movements.

18. In an air line lubricator having a passage therethrough for the flow of air under pressure and a cross bore traversing the passage, adjustable means journalled in the cross bore and disposed in the path of flow of the air therethrough for producing a pressure differential between the inlet and outlet of said passage effective at said cross bore when air is flowing through said passage, said adjustable means including a lubricant diffusion blade of porous material rotatably mounted for rotation about the axis of the cross bore from a position aligned edgewise to the direction of air flow through the passage to a position crosswise to the direction of air flow to vary its silhouette exposure to the air flow, a shield rotatable in said cross bore and having a wall portion spaced from said diffusion blade and movable from a position aligned parallel with the direction of air flow to a position substantially closing the major portion of the flow area of the passage ahead of said diffusion blade, plug means for rotating said blade and having a conduit for supplying lubricant to said blade at the lower of said differentiated pressures, lubricant reservoir supply means subjected to the higher of said differentiated pressures for supplying lubricant to said diffusion blade through said conduit, said shield being adjustable to provide a pressure differential in reverse relationship with the quantity of air flowing through the passage, and said lubricant diffusion blade having a portion of said flowing air passing through it to flush lubricant therefrom in fine particles.

References Cited by the Examiner
UNITED STATES PATENTS

| | | | |
|---|---|---|---|
| 2,524,995 | 10/50 | Sassano | 287—103 |
| 2,702,094 | 2/55 | Maha | 184—55 |
| 2,718,934 | 9/55 | Norgren et al. | 184—55 |
| 2,844,400 | 7/58 | Snell | 287—103 |
| 2,889,009 | 6/59 | Endebak et al. | 184—55 |
| 3,085,654 | 4/63 | Friedell et al. | 184—55 |
| 3,106,021 | 10/63 | Borden | 184—56 |
| 3,149,698 | 9/64 | Riske et al. | 184—55 |

LAVERNE D. GEIGER, *Primary Examiner.*